United States Patent [19]

Iyeta

[11] 4,113,265
[45] Sep. 12, 1978

[54] TONE PICKUP ARM DEVICE KEEPING EXCELLENT DYNAMIC LATERAL BALANCE AND DAMPING EFFECT

[75] Inventor: Motoi Iyeta, Hamakita, Japan

[73] Assignee: Nippon Gakki Seizo Kabushiki Kaisha, Hamamatsu, Japan

[21] Appl. No.: 786,392

[22] Filed: Apr. 11, 1977

[30] Foreign Application Priority Data

Apr. 12, 1976 [JP] Japan .................................. 51-41017

[51] Int. Cl.² .............................................. G11B 3/16
[52] U.S. Cl. .................................. 274/23 R; 274/23 A
[58] Field of Search ............................. 274/23 R, 23 A

[56] References Cited

U.S. PATENT DOCUMENTS 3,231,283  1/1966  Stanton .............................. 274/23 R
3,649,031  3/1975  Templin .............................. 274/23 R Primary Examiner—Steven L. Stephan
Attorney, Agent, or Firm—Cushman, Darby & Cushman

[57] ABSTRACT

A pickup arm device having a dynamic damper and an adjustable dynamic lateral balancer both of which are provided between the head shell and the fulcrum at which the pickup arm is supported. The dynamic lateral balancer is arranged so that it has a low center of gravity. Accordingly, the lateral balance of the pickup arm does not vary throughout the tracking movement of the pickup arm. Also, the position of the weight pieces of the balancer can be adjusted to obtain the desired reproduction frequency. Furthermore, by the adjustment of compliance and resistance of the damper, it is possible to vary only the resonance peak of the resonance frequency in the low frequency range of the pickup arm device.

5 Claims, 9 Drawing Figures though the pickup arm and is again re-transmitted back to the stylus, and for preventing the reproduction of externally occurring vibrations, which reproduction being caused when such externally developed vibrations are transmitted to the stylus. The symbol La represents the mass of the pickup arm having the head shell 4 and a counter weight 2.

TONE PICKUP ARM DEVICE KEEPING EXCELLENT DYNAMIC LATERAL BALANCE AND DAMPING EFFECT

BACKGROUND OF THE INVENTION (a) Field of the Invention

The present invention is concerned with a pickup arm device for use in a record player for an audio disc or a video disc, and more particularly it relates to an improved pickup arm device of the linear tracking type keeping a constant lateral horizontal balance of the pickup arm during the tracking movement of the pickup arm, and at the same time satisfactorily absorbing internal as well as external noise components due to the vibration of various parts of the record player.

(b) Brief Description of the Prior Art

In the conventional tone pickup arm device, a consideration is paid to such matters as: "good initial start of movement" of the pickup arm, "good tracking ability", "reduction of resonance peak in the low frequency range", "anti-skating" and "good static lateral balance". However, the secondary resonance, which takes place in such portions as the site of fulcrum of the tone arm and other parts of the tone pickup arm device excepting the stylus due to the vibration of the stylus of the cartridge during the play of a disc, is transmitted back to the stylus again, and this transmitted secondary resonance is reproduced as noises. Moreover, the vibrations of those parts of the disc player other than the above-mentioned portions are transmitted to the stylus through the portion at which the pickup arm as a whole is attached to the base of the disc player, and such vibrations are also reproduced as noises.

FIG. 1 shows a most primitive example of the above-mentioned conventional tone pickup arm arrangement, illustrated in an explanatory style. This pickup arm 1a is supported at a fulcrum position P between a head shell 4 and a counter weight 2. There is not provided any means for preventing the occurrence of secondary resonance of those members constituting the tone pickup device due to the vibration of the stylus during the play of a record disc on a sound-reproducing apparatus such as a record player, nor a means for preventing the occurrence of distortion of higher harmonics due to the fact that the vibration of the stylus is transmitted firstly through the pickup arm and is again re-transmitted back to the stylus, and for preventing the reproduction of externally occurring vibrations, which reproduction being caused when such externally developed vibrations are transmitted to the stylus. The symbol La represents the mass of the pickup arm having the head shell 4 and a counter weight 2.

In order to eliminate such undesirable drawbacks of the tone pickup arm device of the prior art shown in FIG. 1, there have been proposed and put to practice the following tone pickup arm devices.

These known pickup arm devices are shown in FIGS. 2 through 4. In the example of FIG. 2, the tone arm 1b is provided with a dynamic damper 3 made of a material having a compliance CP1 and a resistance RP1, at a position between the arm supporting fulcrum P and a counter weight 2 but closer to the counter weight 2. In the example shown in FIG. 3, the tone arm 1c has a dynamic damper 3 of a compliance CP1 and a resistance RP1. This dynamic damper 3 is provided between the head shell 4 and the fulcrum P, closer to the latter. In the example shown in FIG. 4, the tone arm 1d is equipped with two dynamic dampers 3a and 3b, of which the first damper 3a having a compliance CP1 and a resistance RP1 is provided at a position between the fulcrum P and the counter weight 2, and the second damper 3b having a compliance CP2 and a resistance RP2 is provided at a position between the head shell 4 and the fulcrum P but closer to this fulcrum. It should be understood that in these figures, $La_1$ represents the mass of that portion of the tone arm 1b, 1c or 1d carrying the head shell 4 from the head shell up to the damper 3, and that $La_2$ represents the mass of that portion of the tone arm 1b, 1c or 1d on that side carrying the counter weight and extending up to the nearest damper 3 or 3a.

Vibration of a stylus on the pickup arm develops a moment of rotation in a vertical plane. This moment of rotation is substantially supressed in such a pickup arm having no dynamic damper therein as shown in FIG. 1 due to the rigidity of the arm itself. However, in the above-mentioned conventional examples shown in FIGS. 2 through 4, the provision of the dynamic damper(s) 3 in the pickup arm gives rise to such moment of rotation and even makes the moment of rotation unstable.

Further in the conventional pickup arms, no sufficient consideration is given to dynamic lateral balance of the pickup arm which is a serious problem especially if the pickup arm is used in the linear tracking manner.

SUMMARY OF THE INVENTION

It is, therefore, a primary object of the present invention to eliminate those drawbacks and inconveniences noted in the pickup arm devices of the prior art and to provide an improved pickup arm device which keeps excellent dynamic lateral horizontal balance and yet has a good damping ability, during the play of a record disc.

Another object of the present invention is to provide a pickup arm device as mentioned above, which has a dynamic damper and a dynamic lateral horizontal balancer which are provided at relatively spaced positions located between the head shell and the pickup arm supporting fulcrum but closer to the fulcrum.

Still another object of the present invention is to provide a pickup arm device as stated above, in which the above-said dynamic lateral horizontal balancer comprises weight pieces which each has a low center of gravity with respect to the arm portion to thereby insure substantially non-variable horizontal balance of the pickup arm during the tracking movement of this pickup arm.

Still further object of the present invention is to provide a pickup arm device having the above-mentioned features, in which the pickup arm is of the straight type.

In accordance with an aspect of this invention there is provided an improved pickup arm device which is arranged so that a dynamic damper and a dynamic lateral horizontal balancer are provided in spaced relationship on the pickup arm of straight type at such locations between the head shell and the arm-supporting fulcrum. This balancer may be regarded as a mechanical resonator and be arranged so as to be freely adjustable to match the required frequency. More specifically, a dynamic damper is provided at a position between the head shell and the pickup arm supporting fulcrum but closer to the latter to prevent the undesirable transmission of the various vibrations; and a dynamic lateral balancer is provided as an outrigger member at a position between the head shell and the fulcrum but closer to the latter in spaced relation to the damper to serve as an inertia member for compensating for the loss of rigidity of the pickup arm due to the provision of the dynamic damper and for offsetting the moment of rotation which develops in the pickup arm due to the vibration of the stylus and to utilize this dynamic lateral balancer as a mechanical resonator.

The above and other objects, features and advantages of the present invention will become apparent by reading the following detailed description of the preferred embodiment when taken in conjunction with the accompanying drawings.

DETAILED DESCRIPTION OF THE PREFERRED EMBODIMENT

Figure 1:
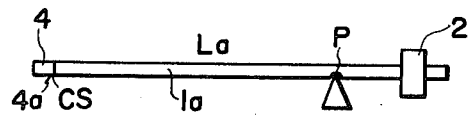
FIGS. 1 through 4 are explanatory diagrammatic illustrations of a side view of known tone pickup arm device arrangements.
Figure 2:
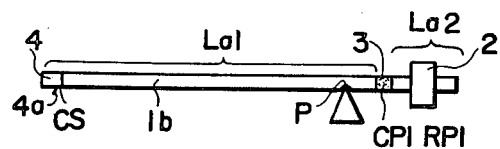
Figure 3:
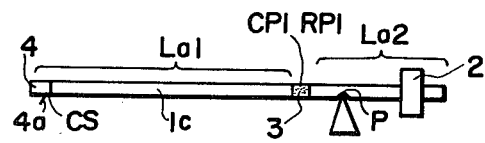
Figure 4:
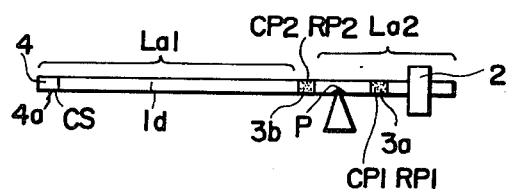
Figure 5:
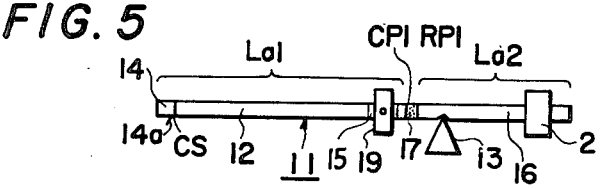
FIG. 5 is an explanatory diagrammatic illustration of a side view of the pickup arm device according to a preferred example of the present invention.
Figure 6:
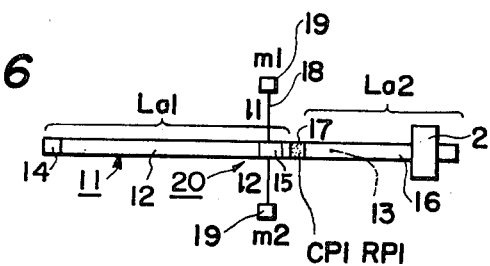
FIG. 6 is an explanatory diagrammatic illustration of a plan view of same.

Description will hereunder be made with respect to a preferred embodiment of the present invention by referring to the drawings.

In FIGS. 5, 6, 7 and 8, there is shown an exemplary illustration of the pickup arm device according to the present invention, being indicated generally at 11. This pickup arm device 11 comprises: an arm member 12 extending between a head shell 14 and an arm center member 16 which includes a fulcrum 13 of the pickup arm device 11 and a counter weight 2; an arm end member 15 which is mechanically coupled to the arm member 12 via the arm center member 16; a dynamic damper 17 made of an elastic material such as natural rubber, synthetic rubber or like material and having a compliance of CP1 and a resistance of RP1 whose values can be adjusted in a manner mentioned below, and being coupled, in a sandwich fashion, to the arm center member 16 between two arm center pieces 16a and 16b which jointly constitute the arm center member 16; and a dynamic lateral horizontal balancer generally indicated at 20 which is secured to the arm end member 15 and which is comprised of two supporting bars 18 and 18 having lengths $l_1$ and $l_2$ extending outwardly from the opposite lateral sides of the arm end member 15 and further comprised of two weight pieces 19 and 19 secured to the farther ends of the bars 18 and 18, respectively, and having a large moment of inertia, with their masses being $m_1$ and $m_2$ respectively.

Figure 8:
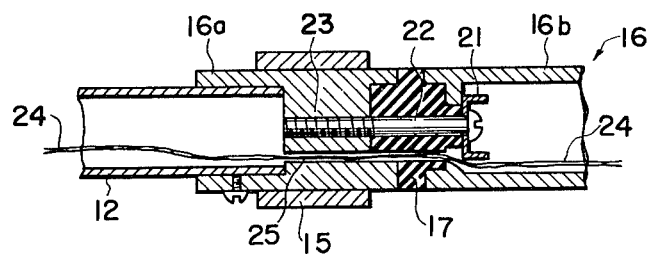
FIG. 8 is a sectional view of that portion of the pickup arm of the present invention where a dynamic damper is provided.

As will be seen better in FIG. 8, the damper-carrying portion is arranged so that the damper 17 is secured to a coupling member 23 on one end of the arm center piece 16a by a bolt 22 which is screwed into this coupling member 23 via a washer 21 located at one end of the arm center piece 16b. The coupling member 23, in turn, tightly receives that end portion of the arm member 12 located away from the head shell 14. As seen from the figure, the damper 17 has the same outer diameter with the adjacent arm center pieces 16a and 16b so that these pieces may not be brought into contact with each other. Lead wires 24 from the head shell pass through an elongated bore 25 formed through the coupling member 23 and damper 17 to be led out to other part of the pickup arm.

By arranging the pickup arm device 11 in a manner described above, it is possible to vary only the resonance peak Q in the low resonance frequency of the pickup arm 11 by the selection of the compliance CP1, the resistance RP1 and the ratio between the mass $La_1$ of the arm member 12 and the mass $La_2$ of the arm center member 16 of the pickup arm device 11. The compliance CP1 and resistance RP1 are mainly determined by the material and the shape of the dynamic damper 17 but can be adjusted to a considerable extent by changing the screwing strength of the bolt 22. Further, it becomes possible that the vibrations of other parts excepting the stylus which are otherwise transmitted via the fulcrum 13 to the cartridge CS and their resultant adverse effects imparted onto the required reproduced signals of the record disc are absorbed by the dynamic damper 17. It is also possible, by said arrangement, to obviate the adverse effects which are otherwise added to the reproduction signals as the vibration of the stylus is first transmitted to the fulcrum 13 through the arm member 12 and through the arm center member 16 and then is reflected therefrom back to the stylus again.

Figure 9:
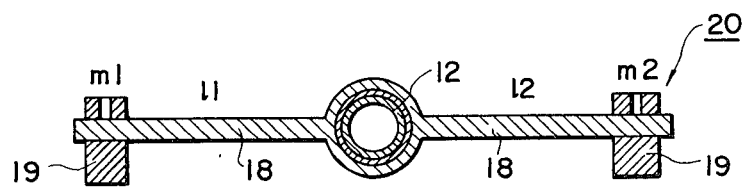
FIG. 9 is a sectional view of a dynamic lateral horizontal balancer employed in the present invention.

The dynamic lateral balancer 20 shown in section in FIG. 9 serves to augment the inertial mass of the pickup arm device 11 including the head shell 14, the cartridge CS and the arm member 12 and to thereby prevent the possible displacement of the pickup arm device 11 which otherwise is caused by the lateral vibrations of the stylus in the head shell 14, insuring the dynamic horizontal position of the pickup arm device 11 during its tracking movement.

Furthermore, the lengths $l_1$ and $l_2$ of the supporting bars 18 and 18 and the masses $m_1$ and $m_2$ of the weight pieces 19 and 19 all of which constitute the dynamic lateral balancer 20 may be selected so as to vary, as desired, the mechanical resonance characteristic of this balancer 20, i.e. the resonance frequency $f_o = (am^2)/(2\pi l^2) \cdot R \cdot \sqrt{E/P}$ (wherein: $R = D/4$; $D$ represents the diameter of the supporting bar 18; $E$ represents the Young's modulus of the supporting bar 18; $P$ represents the specific gravity of the supporting bar 18; and $am$ is determined as $\beta = m/M$), and as a result it is possible to adjust the tone color of the sound which is reproduced.

Figure 7:
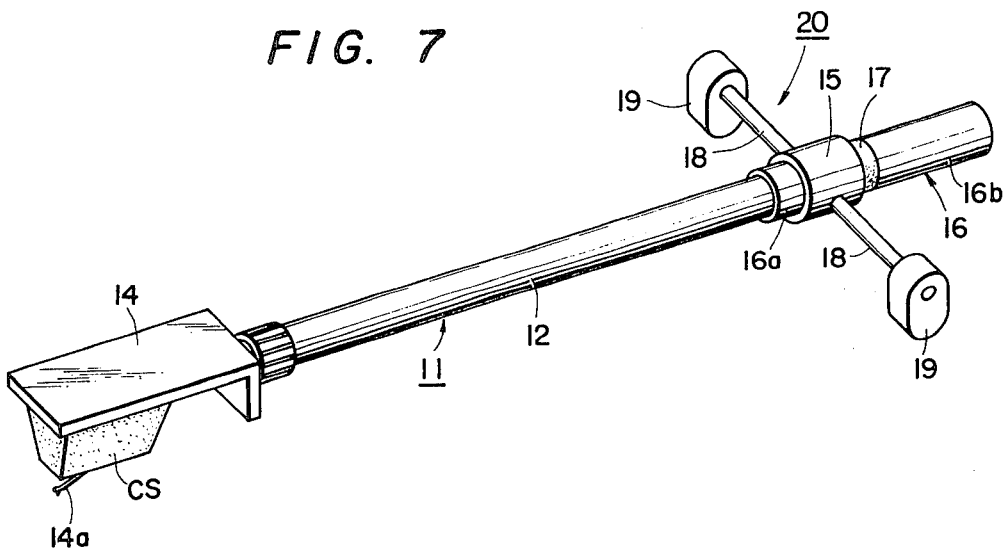
FIG. 7 is a perspective view of the pickup arm device, partly broken away.

As will be noted in FIG. 7, the dynamic lateral balancer 20 is arranged so that its weight pieces 19 and 19 are so provided as to give a relatively low center of gravity. Therefore, the pickup arm device 11 as a whole has a relatively low center of gravity. As a result, this dynamic balancer 20 insures that a constant horizontal balance of the pickup arm device 11 is kept throughout its tracking movement. It should be understood, however, that the dynamic balancer 20 is not limited to the illustrated configuration. The supporting bars 18 and 18 may, for example, be curved downwardly from the sites at which they are secured to the arm end member 15. In the known pickup arm devices, the balancer is intended to insure the static balance of the pickup arm during the stationary period rather than the dynamic period, and the balancer is provided at a site posterior to the arm-supporting fulcrum closer to the counter weight. According to the present invention, consideration is given not only to the static balance, but also to the dynamic balance of the pickup arm device. Thus, the role of the dynamic balancer of the present invention differs from that of the known balancers. Accordingly the pickup arm device of this invention is suitable especially for the linear tracking pickup arm device the whole of which is displaced linearly in accordance with the reproduction of a disc record.

The dynamic damper 17, in the present invention, has been shown as being positioned at a site in the background of the dynamic balancer 20. It should be understood that the positions of these two members may be reversed, and yet same effects can be obtained.

I claim:

1. A pickup arm device comprising:
   a pickup arm;
   a dynamic damper provided in said pickup arm to divide the pickup arm into a rear and a front part;
   a fulcrum supporting said pickup arm and positioned at said rear part of the pickup arm;
   a head shell provided on one end of said front part of the pickup arm remote from said damper; and
   a dynamic lateral balancer provided on said front part of the pick arm but spaced from said damper and located closer to said fulcrum than is said head shell on said front part.

2. A tone pickup arm device according to claim 1, in which: said dynamic lateral balancer is positioned ahead of said dynamic damper toward the head shell.

3. A tone pickup arm device according to claim 1, in which: said dynamic damper is made with an elastic material.

4. A tone pickup arm device according to claim 3, in which: said dynamic lateral balancer comprises two weight pieces adjustably secured to the outer ends of two supporting bars extending from the tone arm, and has a relatively low center of gravity with respect to the pickup arm.

5. A tone pickup arm device according to claim 1 in which said pickup arm is substantially straight for use in a linear tracking operation.

* * * * *